(12) United States Patent
Mutikainen et al.

(10) Patent No.: US 7,822,035 B2
(45) Date of Patent: Oct. 26, 2010

(54) USE OF COMMUNICATION SERVICE IDENTIFIERS

(75) Inventors: Jari Mutikainen, Lepsämä (FI); Miikka Poikselkä, Espoo (FI)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 11/715,209

(22) Filed: Mar. 7, 2007

(65) Prior Publication Data
US 2008/0219250 A1 Sep. 11, 2008

(51) Int. Cl.
H04L 12/28 (2006.01)
H04L 12/66 (2006.01)
G06F 15/16 (2006.01)
G06F 15/173 (2006.01)

(52) U.S. Cl. .................. 370/392; 370/401; 709/203; 709/227

(58) Field of Classification Search .................. 370/392, 370/401; 709/203, 227
See application file for complete search history.

(56) References Cited

U.S. PATENT DOCUMENTS

| | | | |
|---|---|---|---|
| 6,888,828 B1 * | 5/2005 | Partanen et al. | 370/389 |
| 7,406,057 B2 * | 7/2008 | Isomaki et al. | 370/328 |
| 7,509,652 B2 * | 3/2009 | Niemi | 719/318 |
| 7,555,555 B2 * | 6/2009 | Park et al. | 709/227 |
| 7,586,903 B2 * | 9/2009 | Song et al. | 370/352 |
| 7,710,950 B2 * | 5/2010 | Buckley et al. | 370/354 |
| 7,742,578 B1 * | 6/2010 | Klesper et al. | 379/45 |
| 7,760,707 B1 * | 7/2010 | Bates | 370/352 |
| 2004/0003041 A1 * | 1/2004 | Moore et al. | 709/204 |
| 2004/0028080 A1 * | 2/2004 | Samarasinghe et al. | 370/486 |
| 2005/0147086 A1 * | 7/2005 | Rosenberg et al. | 370/352 |
| 2005/0220039 A1 * | 10/2005 | Hoshino et al. | 370/261 |
| 2006/0189340 A1 * | 8/2006 | Sung et al. | 455/518 |
| 2006/0195565 A1 * | 8/2006 | De-Poorter | 709/224 |
| 2007/0058789 A1 * | 3/2007 | Lim et al. | 379/88.17 |
| 2007/0171907 A1 * | 7/2007 | Mansutti et al. | 370/389 |
| 2007/0189279 A1 * | 8/2007 | Thalanany et al. | 370/356 |
| 2008/0025492 A1 * | 1/2008 | Heinze et al. | 379/220.01 |
| 2008/0056248 A1 * | 3/2008 | Braudes et al. | 370/389 |
| 2008/0159262 A1 * | 7/2008 | Crable et al. | 370/352 |
| 2008/0247348 A1 * | 10/2008 | Wilson et al. | 370/313 |

OTHER PUBLICATIONS

Rosenberg et al, "Caller Preferences for the Session Initiation Protocol (SIP)", Aug. 2004, Cisco Systems, RFC 3841, pp. 1-26.*

(Continued)

*Primary Examiner*—Alpus H Hsu
(74) *Attorney, Agent, or Firm*—Harrington & Smith

(57) ABSTRACT

Disclosed is a method in an application server. A request for initiating a communication session is received, and responsive to the request including a first service identifier pertaining to a service not supported by the application server, the first service identifier is removed from the request. A response to the request is received, and responsive to having removed the first service identifier from the request and the response including a second service identifier pertaining to the same service as the first service identifier, the second service identifier is removed from the response.

20 Claims, 3 Drawing Sheets

OTHER PUBLICATIONS

3GPP TS 23.228, V7.6.0 (Dec. 2006), "3rd Generation Partnership Project; Technical Specification Group Services and System Aspects; IP Multimedia Subsystem (IMS); Stage 2 (Release 7)", 215 pgs.

3GPP TS 24.229, V7.6.0 (Dec. 2006), "3rd Generation Partnership Project; Technical Specification Group Core Network and Terminals; IP Multimedia Call Control Protocol Based on Session Initiation Protocol (SIP) and Session Description Protocol (SDP); Stage 3, (Release 7)", 401 pgs.

Change Request 24.229 CR1579, Rev. 3, "Clarification of the Handling ICSI", 3GPP TSG CT Plenary Meeting #35, Limassol, Cyprus, Mar. 7-9, 2007, 34 pgs.

* cited by examiner

USE OF COMMUNICATION SERVICE IDENTIFIERS

FIELD OF THE INVENTION

The present invention generally relates to communication networks and particularly but not exclusively to the use of a communication service identifiers.

BACKGROUND OF THE INVENTION

3GPP standardisation body has a work item to define a solution for communication service identifiers in IMS (IP multimedia core network subsystem). The current versions of the related standards are 3GPP TS 24.229 v7.6.0 (2006-12) and 3GPP TS 23.228 v7.6.0 (2006-12). Communication service identifier work aims to provide a mechanism for the following issues: how to route SIP (Session Initiation Protocol) sessions to a certain AS (Application Server), how to charge the sessions, how to apply different policies to the session, and how to select the right application in a terminating UE (User Equipment) on the basis of a certain service identifier value. Examples of such service identifier values are OMA-POC (Open Mobile Alliance—push to talk over cellular), OMA-IM (IP multimedia) and 3GPP MMTel (multimedia telephony service).

The following has been proposed for the communication service identifiers in change request 24.229 CR 1579, rev 3, "Clarification of the handling ICSI": An originating UE that supports and wishes to initiate a certain service adds the corresponding service identifier value to an Accept-Contact header of an outgoing request. Only one value can be added per request. In addition, the originating UE may add this value and also all other supported service identifier values into a Contact header. A terminating UE should then determine the received service identifier value in the Accept-Contact header and select an application to be used accordingly. In addition, the terminating UE should add this value and also all other supported service identifier values to the Contact header of a first reliable or final response sent to the originating UE.

Certain rules for an UE to understand in connection with session establishment, whether the session supports a particular service, have been proposed. Namely, if a terminating UE receives a service identifier value in the Accept-Contact header, or an originating UE receives in the Contact header of a response the same service identifier value it included in the Accept-Contact header of the outgoing request, then the UE understands that the session is able to support the service.

In 3GPP IMS service architecture, entities called B2BUAs (back-to-back user agent) implement the services in the network. Currently it has been proposed that B2BUAs between UEs may replace or add the communication service identifiers in the Accept-Contact and Contact headers. This in combination with the currently proposed rules for UEs to interpret the content of the Accept-Contact and Contact headers results in that UEs cannot know for sure whether some service identifier has been added by a B2BUA or the other UE. For this reason the UEs cannot know, whether the end-to-end session really supports the requested service or not. That is, the currently proposed solution does not work properly.

Thus there is a need for further consideration.

SUMMARY

According to a first aspect of the invention there is provided a method in an application server, the method comprising:
receiving a request for initiating a communication session,
responsive to the request comprising a first service identifier pertaining to a service not supported by the application server, removing the first service identifier from the request,
receiving a response to the request, and
responsive to having removed the first service identifier from the request and the response comprising a second service identifier pertaining to the same service as the first service identifier, removing the second service identifier from the response.

The first service identifier may be for example a service identifier of a requested service and a second service identifier may be for example a service identifier of a supported service.

In an embodiment of the invention the first and second service identifiers comprised in the request and response are maintained otherwise unmodified.

Maintaining unmodified means that service identifiers are not removed, added or altered.

In an embodiment of the invention, if the request comprises a first service identifier pertaining to an unallowed service, the first service identifier is removed from the request.

In an embodiment of the invention, if the request comprises a set of one or more second service identifiers, the received set of second identifiers comprised in the request is maintained unmodified.

In an embodiment of the invention the first service identifier resides in a first header and the one or more second service identifiers reside in a second header. The first header may be for example an accept-contact header and the second header may be for example one of the following: a contact header, a supported header, a user-agent header, a server header, and a services header.

In an embodiment of the invention the request and response are processed such that:
  if the first header comprises a service identifier for a service, which is supported by the application server, the request is forwarded with said service identifier in the first header, and the received one or more service identifiers, if any, in the second header of the associated response are forwarded unmodified,
  if the first header comprises a service identifier for a service, which is not supported by the application server, the request is forwarded without a service identifier in the first header, and the corresponding service identifier, if present, is removed from the second header of the associated response and the response is forwarded without said removed service identifier in the second header, and
  if the first header does not comprise a service identifier for a service, the request is forwarded without a service identifier in the first header, and the received one or more service identifiers, if any, in the second header of the associated response are forwarded unmodified.

According to a second aspect of the invention there is provided an application server comprising:
an input configured to receive a request for initiating a communication session and
a response to the request, and
a processing unit configured
to remove, responsive to the request comprising a first service identifier pertaining to a service not supported by the application server, the first service identifier from the request, and
to remove, responsive to having removed the first service identifier from the request and the response comprising a second service identifier pertaining to the same service as the first service identifier, the second service identifier from the response.

According to a third aspect of the invention there is provided a memory medium comprising computer executable program code configured to cause an apparatus to perform the method according to the first aspect of the invention.

The memory medium may comprise a solid state, optical, magnetic or magneto-optical storage medium. The medium may be such as a flash-ram, memory tape, memory disc, floppy disc, compact disc (CD), digital versatile data disc (DVD).

According to a fourth aspect of the invention there is provided an application server comprising:
means for receiving a request for initiating a communication session and for receiving a response to the request,
means for removing, responsive to the request comprising a first service identifier pertaining to a service not supported by the application server, the first service identifier from the request, and
means for removing, responsive to having removed the first service identifier from the request and the response comprising a second service identifier pertaining to the same service as the first service identifier, the second service identifier from the response.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

Figure 1:
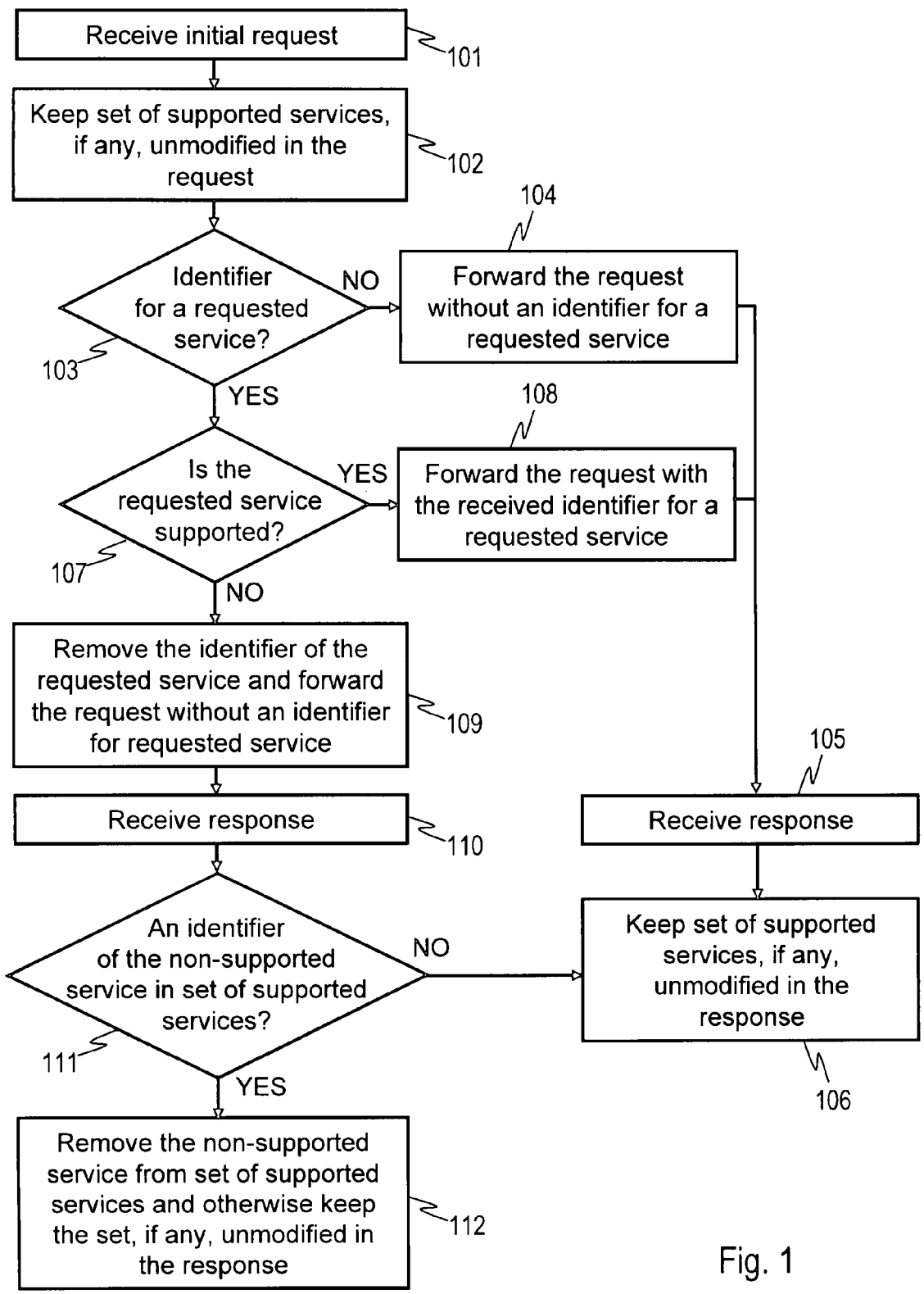
FIG. 1 shows a flow diagram of a method according to an embodiment of the invention.

In the following, details of various embodiments of the invention are disclosed in connection with user terminals (UE) and session initiation protocol (SIP) sessions. In the disclosed examples accept-contact and contact headers defined for SIP are used for conveying communication service identifiers. It must however be understood that these are only illustrative examples and that the invention may apply to other environments as well. For example other headers, such as a supported header, a user-agent header, a server header or some new header type, which could be called e.g. a services header, may be used. Alternatively, service identifiers might be conveyed by some other means, for example in an SDP (Session Description Protocol) element or some other SIP content-type element outside of SIP headers.

The services concerned in the examples may include for example OMA-POC, OMA-IM and 3GPP MMTel. The discussed solutions may apply to other services, as well.

According to an embodiment of the invention, a communication session establishment is performed as follows:

An originating UE adds a communication service identifier associated with a requested service into an accept-contact header of an initial session establishment request and service identifiers of all services it supports are added to a contact header of the initial request. Then, the originating UE determines whether the requested service is supported in the established session on the basis of content of a contact header in a first provisional or final response associated with the initial request. If the identifier of the requested service is included in the contact header, the session supports the service, otherwise the service is not supported. In the latter case, the UE determines the session capabilities by regular means, e.g. SDP (Session Description Protocol) negotiation. In addition to the identifier of the requested service, the UE may receive other service identifiers in the contact header. In that case the UE understands that these services may be supported by the other end, but not within this particular session. In order to use these services the UE may initiate a new session with the corresponding service identifier in the accept-contact header.

A terminating UE determines the requested service from a received accept-contact header of an initial session establishment request. The service identifier included in the accept-contact header indicates the service that is requested within this session. If the accept-contact does contain a service identifier, the session does not support any service. In the latter case, the UE determines the session capabilities by regular means, e.g. SDP negotiation. In either case the terminating UE adds service identifiers of all services it supports to a contact header of a response to the received initial request. In addition to the accept-contact header the UE may receive service identifiers in a contact header. In that case the UE understands that these services may be supported by the other end, but they are not requested within this particular session. In order to use these services the UE may initiate a new session with the corresponding service identifier in the accept-contact header.

An application server, e.g. a B2BUA, receives an initial session establishment request.

If the initial request includes in an accept-contact header an identifier for a service, which is supported by the application server, the application server shall maintain the received service identifier in the accept-contact header of the initial request. Then, when the application server receives a response to the request, it passes service identifiers included in a contact header of the response unmodified to the originating UE provided that there are service identifiers in the contact header of the response.

If the initial request includes in the accept-contact header an identifier for a service, which is not supported by the application server, the application server shall remove the received service identifier from the accept-contact header of the initial request. Then, when the application server receives a response to the request, it determines whether the service identifier, which it removed from the initial request, is included in the contact header of the response. If so, it removes that service identifier from the contact header, but passes the other service identifiers, if any, unmodified to the originating UE. Otherwise all service identifiers, if any, included in the response are passed unmodified to the originating UE.

If the initial request does not include in the accept-contact header an identifier for a service, the application server shall not include any service identifier in the accept-contact header of the initial request. Then, when the application server receives a response to the request, it passes the service identifiers in the contact header of the response unmodified to the originating UE provided that there are service identifiers in the contact header of the response.

In summary, an application server does not add any additional service identifiers to a session establishment request or an associated response. The application server only removes identifiers for services which it does not support and for a set of supported services included in a session establishment request the application server does not make any modifications. Thereby one achieves that UEs know, whether a particular session from one end to the other supports a particular service.

A communication service identifier of various embodiments of the invention may be for example certain bit pattern or bit value, certain numerical identifier or some other type of an identifier.

FIG. 1 shows a method in an application server according to an embodiment of the invention. It must be noted that the phases shown in the flow diagram are not necessarily subsequent phases. Instead they may be conducted in parallel or the order of the phases may be changed. Some of the shown phases may be left out from a particular implementation and some of the phases may be repeated.

In phase 101 an initial session establishment request is received and in phase 102 a set of identifiers of supported services is kept unmodified, if such identifiers of supported services are included in the request. The identifiers of supported services may be included in a contact header, for example. That is, the application server does not add any additional supported services or remove any of the existing ones.

In phase 103 it is checked whether the request comprises an identifier for a requested service. The identifier for a requested service may be included in a accept-contact header, for example. If an identifier for a requested service does not exist, the method proceeds to phase 104, wherein the request is forwarded without such identifier. Then, a response to the request is later received in phase 105 and in phase 106, the application server keeps a set of identifiers of supported services unmodified in the response, if such identifiers of supported services are included in the response. That is, considering the identifiers of supported services the response is passed on without any modifications.

If it is concluded in phase 103 that there is an identifier for a requested service, it is checked in phase 107, whether the application server supports that particular service. If the service is supported, the method proceeds to phase 108, wherein the request is forwarded with the received identifier of the requested service. Then, like in the case of non-existent identifier of requested service, a response to the request is later received in phase 105 and in phase 106, the application server keeps a set of identifiers of supported services unmodified in the response, if such identifiers of supported services are included in the response.

That is, in these first two cases the application server does not modify any service identifiers included in the request or response.

If it is concluded in phase 107 that the application server does not support the requested service, the method proceeds to phase 109, wherein the identifier of the requested service is removed from the request and the request is forwarded without an identifier for a requested service. Then, a response to the request is later received in phase 110 and in phase 111, it is checked whether a set of identifiers of supported services optionally included in the response includes an identifier of the non-supported service (that is the same identifier that was previously removed from the request). If that particular identifier is not included in the response, the method proceeds to phase 106 and the application server keeps the set of identifiers of supported services unmodified in the response, if such identifiers of supported services are included in the response. And if that particular identifier is included in the response, the method proceeds to phase 112 and the application server removes the identifier of the non-supported service from the response, but keeps identifiers of other supported services unmodified in the response, if such identifiers are included in the response.

That is, the application server may modify certain service identifiers in the request and response if the application server does not support the requested service.

By removing the identifier of a non-supported service from the request and response the application server effectively informs the terminating and originating UE, respectively, of that the requested service is not supported in that particular session, even though both UEs might support it. Likewise, by not adding any additional service identifiers even though the application server might support such additional services one may avoid the situation where support for a service which is not supported by one or the other UE would be implied in the request or response.

In an embodiment of the invention it is additionally or alternatively checked for example in phase 107 of FIG. 1, whether the requested service is allowed (if the sender of the request is allowed to use the service). If the service is allowed the method proceeds to 108, and if the service is unallowed, the method proceeds to phase 109, and from thereon the method continues like above.

Figure 2:
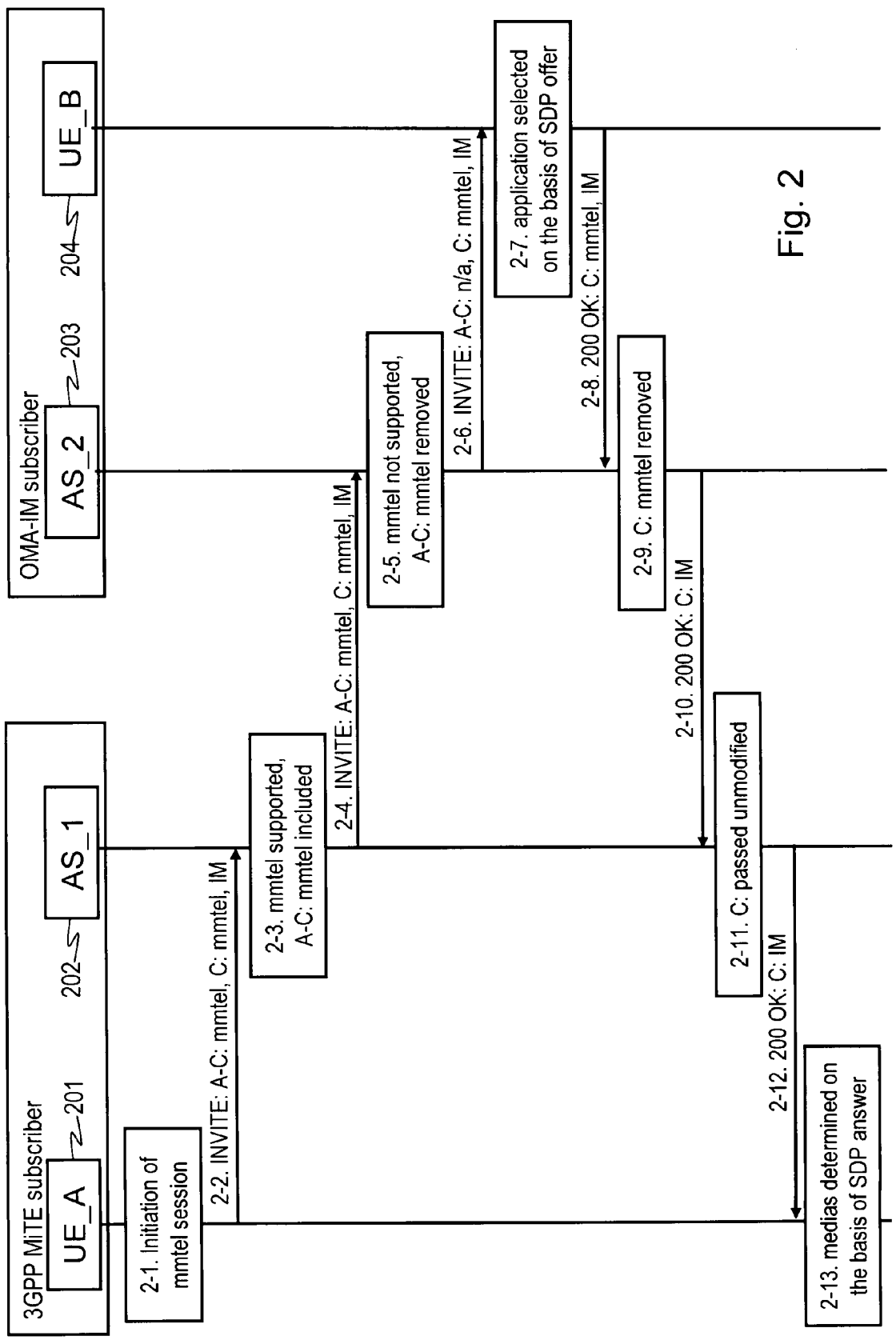
FIG. 2 shows a messaging diagram in a system according to an embodiment of the invention.

FIG. 2 shows a messaging diagram in a system according to an embodiment of the invention. The system comprises a 3GPP MiTE (IMS Multimedia Telephony Communication Enabler) subscriber UE_A 201 and an associated application server AS_1 202, and an OMA-IM subscriber UE_B 204 and an associated application server AS_2 203. The application servers may be for example B2BUAs. It is clear that in practice the system comprises various other elements but for the sake of simplicity they are not shown here.

As an example, the invention may operate as follows in the shown system:

2-1: UE_A, which supports MMTel and OMA-IM services, initiates an MMTel session.

2-2: UE_A sends a SIP INVITE message, where accept-contact header includes a communication service identifier for MMTel and contact header includes communication service identifiers for MMTel and IM (that is, identifiers for all services supported by UE_A).

2-3: AS_1 (originating application server) receives the INVITE 3-2. AS_1 supports MMTel and so MMTel is kept in the accept-contact header.

2-4: AS_1 forwards the INVITE message to AS_2 (terminating application server) with MMTel in the accept-contact header and MMTel and IM in the contact header.

2-5: AS_2 receives the INVITE 2-4. AS_2 does not support MMTel and so it removes MMTel from the accept-contact header. Contact header is kept intact.

2-6: AS_2 forwards the INVITE message to UE_B with MMTel removed from accept-contact header (that is the accept-contact header in INVITE 2-6 does not include a communication service identifier) and MMTel and IM in the contact header.

2-7: UE_B, which supports MMTel and OMA-IM services, receives the INVITE 2-6 and detects that there is no communication service identifier in the accept-contact header and therefore selects the application to be used for the session on the basis of SDP offer instead of a communication service identifier. Additionally UE_B detects that contact header includes communication service identifiers for MMTel and IM and therefore understands that UE_A supports MMTel and IM, but not in this session. (If UE_B wants to have an MMTel or IM session with UE_A, it may initiate a new session, which then may succeed.)

2-8: UE_B responds to the INVITE 2-6 with 200 OK message, where contact header includes communication service identifiers for MMTel and IM (that is, identifiers for all services supported by UE_B).

2-9: AS_2 remembers that for this particular session it removed MMTel from accept-contact header. Thus AS_2 removes the corresponding identifier from the contact header of the 200 OK. Other identifiers in the contact header are kept intact.

2-10: AS_2 forwards the 200 OK message to AS_1 with IM in the contact header.

2-11: AS_1 receives the 200 OK 2-10. As AS_1 did not modify the INVITE for this session it does not modify the 200 OK either.

2-12: AS_1 forwards the 200 OK message to UE_A with IM in contact header.

2-13: UE_A receives the 200 OK 2-12 and detects that MMTel is not included in the contact header and therefore knows to determine available medias for this session on the basis of SDP answer. Additionally UE_A detects that contact header includes communication service identifier IM and therefore understands that UE_B supports IM, but not in this session. (If UE_A wants to have an IM session with UE_B, it may initiate a new session, which then may succeed.)

The invention may be implemented for example by means of a computer program running on a suitable hardware platform or by means of any other suitable combination of hardware, software, special purpose circuits and/or logic.

Figure 3:
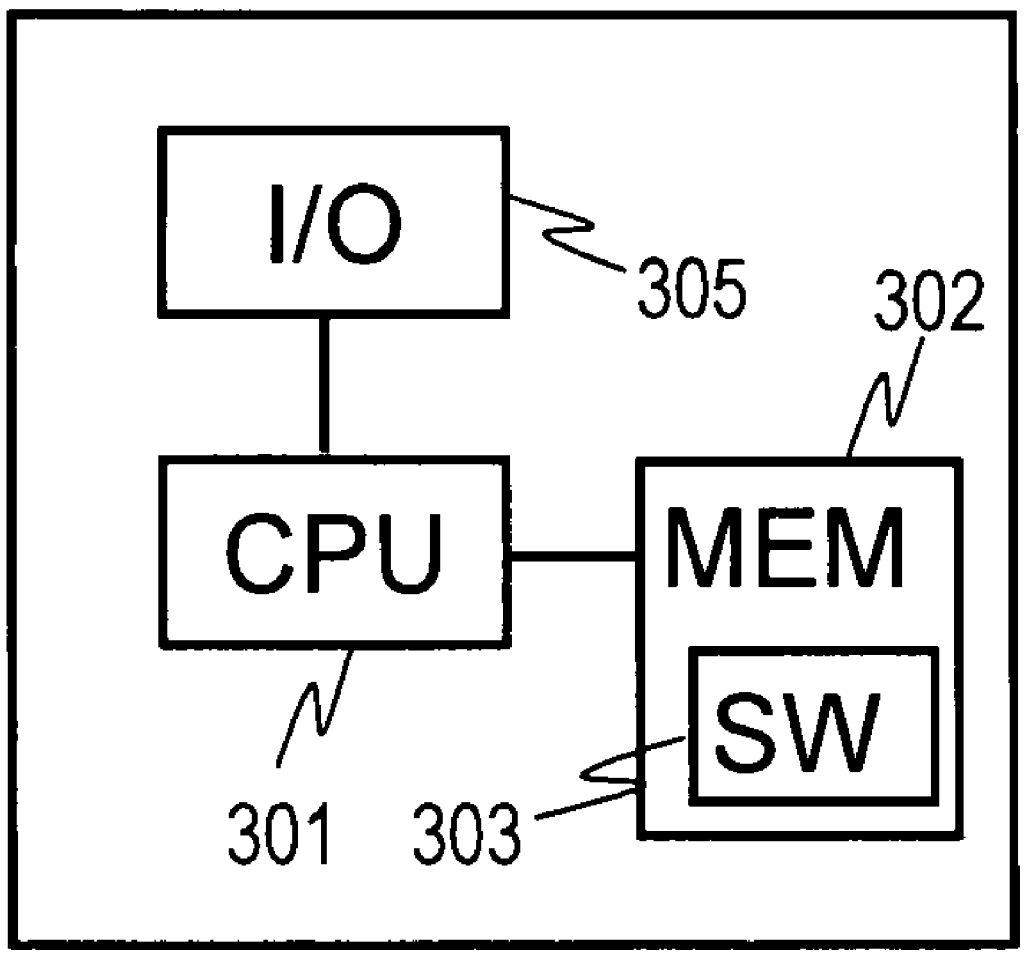
FIG. 3 shows a block diagram of an apparatus suited for operating as an application server according to various embodiments of the invention.

FIG. 3 shows a block diagram of an apparatus 300 suited for operating as an application server of various embodiments of the invention. The apparatus 300 may be a typical computer, such as, a general-purpose computer, laptop or a server, with possibly distributed functions.

The apparatus comprises an input/output (I/O) unit 305 for connecting to communication networks, a memory 302 comprising operating instructions, a processing unit 301 for executing the operating instructions and accordingly controlling other blocks of the apparatus. The apparatus may also comprise a user interface (not shown) for providing output to a user and reading user input. Alternatively, the user interface may be implemented by means of a remote connection or it may be non-existent.

The memory 302 includes a computer program code or software 303 that may comprise instructions for controlling the apparatus to provide some functionality of the invention. The instructions may for example control the apparatus to operate as an application server according to some embodiments of the invention.

The processor is typically a central processing unit (CPU) or a master control unit MCU. Alternatively, the processor may be a microprocessor, a digital signal processor or an application specific integrated circuit, a field programmable gate array, a microcontroller or a combination of such elements. The I/O (input/output) unit 405 is an interface providing connectivity to network. It may be for example a LAN (Local Area Network), Ethernet or WLAN (Wireless LAN) interface or some other communication interface.

It should be appreciated that in this document, words comprise, include and contain are each used as open-ended expressions with no intended exclusivity.

Particular implementations and embodiments of the invention have been described by way of non-limiting examples. It is clear to a person skilled in the art that the invention is not restricted to details of the embodiments presented above, but that it can be implemented in other embodiments using equivalent means without deviating from the characteristics of the invention. Furthermore, some of the features of the above-disclosed embodiments of this invention could be used without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising:
   receiving, at an application server, a request, from an originating user equipment, for initiating a communication session,
   responsive to the request comprising a first service identifier pertaining to a service not supported by the application server, removing the first service identifier from the request,
   forwarding the request having the first service identifier removed to a terminating user equipment,
   receiving, from the terminating user equipment, a response to the request, and
   responsive to having removed the first service identifier from the request and the response comprising a second service identifier pertaining to the same service as the first service identifier, removing the second service identifier from the response.

2. A method according to claim 1, wherein the first service identifier is a service identifier of a requested service and a second service identifier is a service identifier of a supported service.

3. A method according to claim 1, further comprising maintaining the first and second service identifiers comprised in the request and response otherwise unmodified.

4. A method according to claim 1, further comprising
   responsive to the request comprising a service identifier pertaining to an unallowed service, removing the first service identifier pertaining to the unallowed service from the request.

5. A method according to claim 1, further comprising
   responsive to the request comprising a set of one or more service identifiers, maintaining unmodified the received set of one or more identifiers comprised in the request.

6. A method according to claim 1, wherein said first service identifier resides in a first header and said second service identifier resides in a second header.

7. A method according to claim 6, further comprising processing the request and response such that:
   if the first header comprises a service identifier for a service which is supported by the application server, the request is forwarded with said service identifier in the first header, and the received second service identifier, if any, in the second header of the associated response is forwarded unmodified,
   if the first header comprises a service identifier for a service which is not supported by the application server, the request is forwarded without a service identifier in the first header, and the corresponding second service identifier, if present, is removed from the second header of the associated response and the response is forwarded without said removed service identifier in the second header, and
   if the first header does not comprise a service identifier for a service, the request is forwarded without a service identifier in the first header, and the received second service identifier, if any, in the second header of the associated response is forwarded unmodified.

8. A method according to claim 6, wherein the first header is an accept contact header.

9. A method according to claim 6, wherein the second header is one of the following: a contact header, a supported header, a user agent header, a server header, and a services header.

10. An apparatus comprising at least one processor; and at least one memory including computer program code, the at least one memory and the computer program code configured to, with the at least one processor, cause the apparatus to perform at least the following:
to receive a request, from an originating user equipment, for initiating a communication session and a response to the request, from a terminating user equipment,
to remove, responsive to the request comprising a first service identifier pertaining to a service not supported by the apparatus, the first service identifier from the request,
to forward the request having the first service identifier removed to the terminating user equipment, and
to remove, responsive to having removed the first service identifier from the request and the response comprising a second service identifier pertaining to the same service as the first service identifier, the second service identifier from the response.

11. An apparatus according to claim 10, wherein the first service identifier is a service identifier of a requested service and a second service identifier is a service identifier of a supported service.

12. An apparatus according to claim 10, wherein the at least one memory and the computer program code are further configured to maintain the first and second service identifiers comprised in the request and response otherwise unmodified.

13. An apparatus according to claim 10, the at least one memory and the computer program code are further configured to remove, responsive to the request comprising a service identifier pertaining to an unallowed service, the service identifier pertaining to the unallowed service from the request.

14. An apparatus according to claim 10, the at least one memory and the computer program code are further configured, responsive to the request comprising a set of one or more service identifiers, to maintain unmodified the received set of one or more identifiers comprised in the request.

15. An apparatus according to claim 10, wherein said first service identifier resides in a first header and said second service identifier resides in a second header.

16. An apparatus according to claim 15, wherein the at least one memory and the computer program code are further configured to process the request and response such that:
if the first header comprises a service identifier for a service which is supported by the apparatus, the request is forwarded with said service identifier in the first header, and the received second service identifier, if any, in the second header of the associated response is forwarded unmodified,
if the first header comprises a service identifier for a service which is not supported by the apparatus, the request is forwarded without the service identifier in the first header, and the corresponding second service identifier, if present, is removed from the second header of the associated response and the response is forwarded without said removed second service identifier in the second header, and
if the first header does not comprise a service identifier for a service, the request is forwarded without a service identifier in the first header, and the received second service identifier, if any, in the second header of the associated response is forwarded unmodified.

17. An apparatus according to claim 15, wherein the first header is an accept contact header.

18. An apparatus according to claim 15, wherein the second header is one of the following: a contact header, a supported header, a user agent header, a server header, and a services header.

19. A computer-readable memory tangibly encoding a computer executable program code configured to cause a processor executing the program code to perform the method of claim 1.

20. An apparatus comprising:
means for receiving a request, from an originating user equipment, for initiating a communication session and for receiving a response to the request, from a terminating user equipment,
means for removing, responsive to the request comprising a first service identifier pertaining to a service not supported by the apparatus, the first service identifier from the request
means for forwarding the request having the first service identifier removed to the terminating user equipment, and
means for removing, responsive to having removed the first service identifier from the request and the response comprising a second service identifier pertaining to the same service as the first service identifier, the second service identifier from the response.

* * * * *